US012673539B2

(12) United States Patent
Dreyer

(10) Patent No.: US 12,673,539 B2
(45) Date of Patent: Jul. 7, 2026

(54) AUTOMOTIVE CANOPY DOOR WITH REMOVABLE PANEL

(71) Applicant: RSI North America, Inc., Dayton, NV (US)

(72) Inventor: Marius Dreyer, Fort Worth, TX (US)

(73) Assignee: RSI North America, Inc., Fort Worth, TX (US)

( * ) Notice: Subject to any disclaimer, the term of this patent is extended or adjusted under 35 U.S.C. 154(b) by 476 days.

(21) Appl. No.: 18/134,946

(22) Filed: Apr. 14, 2023

(65) Prior Publication Data

US 2024/0343097 A1     Oct. 17, 2024

(51) Int. Cl.
| | |
|---|---|
| *B60J 5/04* | (2006.01) |
| *B32B 3/06* | (2006.01) |
| *B32B 3/30* | (2006.01) |
| *B60J 7/16* | (2006.01) |
| *B60J 7/14* | (2006.01) |
| *B60R 11/06* | (2006.01) |

(52) U.S. Cl.
CPC ............... *B60J 5/0498* (2013.01); *B32B 3/06* (2013.01); *B32B 3/30* (2013.01); *B60J 7/1607* (2013.01); *B60J 7/141* (2013.01); *B60R 11/06* (2013.01)

(58) Field of Classification Search
CPC ........ B60J 5/0498; B60J 7/1607; B60J 7/106; B60J 7/14; B60J 7/141; B60J 7/16; B60J 5/10; B60R 9/06; B60R 9/02; B60R 11/06; B60R 2011/0019; B60R 2011/0021; B62D 33/0723

USPC ... 296/100.02, 100.04, 100.07, 100.09, 57.1, 296/146.1, 146.5, 146.7, 146.11, 163; 292/DIG. 37
See application file for complete search history.

(56) References Cited

U.S. PATENT DOCUMENTS

| | | | | | |
|---|---|---|---|---|---|
| 2,346,656 | A | * | 4/1944 | Berghoff ................. | E05B 85/22 |
| | | | | | 292/192 |
| 5,992,918 | A | * | 11/1999 | Gobart ................... | B60J 5/0473 |
| | | | | | 296/146.13 |
| 9,789,912 | B1 | * | 10/2017 | Marchlewski ....... | B62D 33/027 |
| 9,834,151 | B2 | * | 12/2017 | Henry ...................... | B60R 9/00 |
| 10,780,836 | B1 | * | 9/2020 | Fisher ...................... | B60R 9/02 |
| D1,017,516 | S | * | 3/2024 | Voss ............................ | D12/404 |
| 12,049,197 | B2 | * | 7/2024 | Hoogendoorn ....... | B60P 7/0815 |
| 2004/0007900 | A1 | * | 1/2004 | Block ...................... | B60J 7/106 |
| | | | | | 296/193.12 |
| 2008/0067830 | A1 | * | 3/2008 | Frankham ................ | B60J 7/106 |
| | | | | | 296/100.02 |
| 2009/0008959 | A1 | * | 1/2009 | Rehn ...................... | B60J 5/0405 |
| | | | | | 296/146.7 |
| 2009/0014602 | A1 | * | 1/2009 | Frost ......................... | B60R 7/08 |
| | | | | | 248/100 |

(Continued)

FOREIGN PATENT DOCUMENTS

| | | | | | |
|---|---|---|---|---|---|
| WO | WO-2024035349 A1 | * | 2/2024 | .......... | B62D 29/008 |
| ZA | A2020/01224 | | 11/2021 | | |

*Primary Examiner* — Amy R Weisberg
*Assistant Examiner* — Denise L. Esquivel
(74) *Attorney, Agent, or Firm* — K&L Gates LLP

(57) ABSTRACT
An automotive canopy door includes an external panel having a first side and a second side; an internal panel having a first side and a second side, wherein the first side of the internal panel is coupled to the second side of the external panel; and a removable panel having first side and a second side, wherein the first side of the removable panel is coupled to the second side of the internal panel.

13 Claims, 7 Drawing Sheets

(56)         References Cited

U.S. PATENT DOCUMENTS

| 2011/0037289 A1* | 2/2011 | Moberg | B60J 5/04 |
| | | | 296/146.7 |
| 2019/0219081 A1* | 7/2019 | Hagedorn | F16B 37/14 |
| 2022/0289116 A1* | 9/2022 | Cleaves | B60R 9/02 |
| 2023/0373570 A1* | 11/2023 | Facchinello | B60J 7/106 |

* cited by examiner

AUTOMOTIVE CANOPY DOOR WITH REMOVABLE PANEL

BACKGROUND

The present disclosure generally relates to an automotive canopy door having a removable panel. Typically, a vehicle bed comprises a generally flat surface located behind a vehicle cabin and may typically have sidewalls and a rear tailgate. The vehicle bed may be used for a number of utility purposes, including transporting cargo. Further, a vehicle bed may include a canopy, or cap, creating an enclosure on the vehicle bed. The vehicle canopy may protect cargo from the elements and prevent cargo from falling off of the vehicle bed when the vehicle is moving. Additionally, a vehicle canopy could be useful for providing a compartment for sleeping during overlanding, which consists of overland travel to remote destinations.

SUMMARY

In light of the disclosure herein and without limiting the disclosure in any way, in a first aspect of the present disclosure, which may be combined with any other aspect listed herein unless specified otherwise, an automotive canopy door includes an external panel having a first side and a second side; an internal panel having a first side and a second side, wherein the first side of the internal panel is coupled to the second side of the external panel; and a removable panel having first side and a second side, wherein the first side of the removable panel is coupled to the second side of the internal panel.

In accordance with a second aspect of the present disclosure, which may be used in combination with any other aspect listed herein unless stated otherwise, the internal panel includes a perimeter structure.

In accordance with a third aspect of the present disclosure, which may be used in combination with any other aspect listed herein unless stated otherwise, the perimeter structure includes a first portion that extends outward from the first side of the internal panel and a second portion extends generally coplanar to the first side of the internal panel.

In accordance with a fourth aspect of the present disclosure, which may be used in combination with any other aspect listed herein unless stated otherwise, an adhesive substrate couples the first side of the internal panel to the second side of the external panel.

In accordance with a fifth aspect of the present disclosure, which may be used in combination with any other aspect listed herein unless stated otherwise, the adhesive substrate is disposed between the second portion of the perimeter structure and the second side of the external panel.

In accordance with a sixth aspect of the present disclosure, which may be used in combination with any other aspect listed herein unless stated otherwise, the first portion is configured to provide a space between the external panel and the internal panel, preventing an internal panel securing member from contacting the second side of the external panel.

In accordance with a seventh aspect of the present disclosure, which may be used in combination with any other aspect listed herein unless stated otherwise, the internal panel includes a pressure lock aperture configured to receive a pressure lock coupled to the external panel.

In accordance with an eighth aspect of the present disclosure, which may be used in combination with any other aspect listed herein unless stated otherwise, the internal panel includes a support aperture.

In accordance with a ninth aspect of the present disclosure, which may be used in combination with any other aspect listed herein unless stated otherwise, a support structure is located adjacent to the support aperture.

In accordance with a tenth aspect of the present disclosure, which may be used in combination with any other aspect listed herein unless stated otherwise, the support structure includes a first portion that extends outward from the first side of the internal panel and a second portion extends generally coplanar to the first side of the internal panel.

In accordance with an eleventh aspect of the present disclosure, which may be used in combination with any other aspect listed herein unless stated otherwise, the removable panel includes an aperture configured to receive an attachment.

In accordance with a twelfth aspect of the present disclosure, which may be used in combination with any other aspect listed herein unless stated otherwise, the removable panel includes a plurality of tabs, wherein each of the plurality of tabs comprises a first surface and a second surface.

In accordance with a thirteenth aspect of the present disclosure, which may be used in combination with any other aspect listed herein unless stated otherwise, an interlocking system is disposed between the first surface of each of the plurality of tabs and the second side of the internal panel.

In accordance with a fourteenth aspect of the present disclosure, which may be used in combination with any other aspect listed herein unless stated otherwise, an automotive canopy includes a top panel, a front panel, a plurality of side panels, a rear panel, and at least one door, comprising: an external panel having a first side and a second side; an internal panel having a first side and a second side, wherein the first side of the internal panel is coupled to the second side of the external panel; and a removable panel having first side and a second side, wherein the first side of the removable panel is coupled to the second side of the internal panel.

In accordance with a fifteenth aspect of the present disclosure, which may be used in combination with any other aspect listed herein unless stated otherwise, a modular kit for assembly of automotive canopy includes a top panel, a front panel, a plurality of side panels, a rear panel, and at least one door, comprising: an external panel having a first side and a second side; an internal panel having a first side and a second side, wherein the first side of the internal panel is coupled to the second side of the external panel; and a removable panel having first side and a second side, wherein the first side of the removable panel is coupled to the second side of the internal panel.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
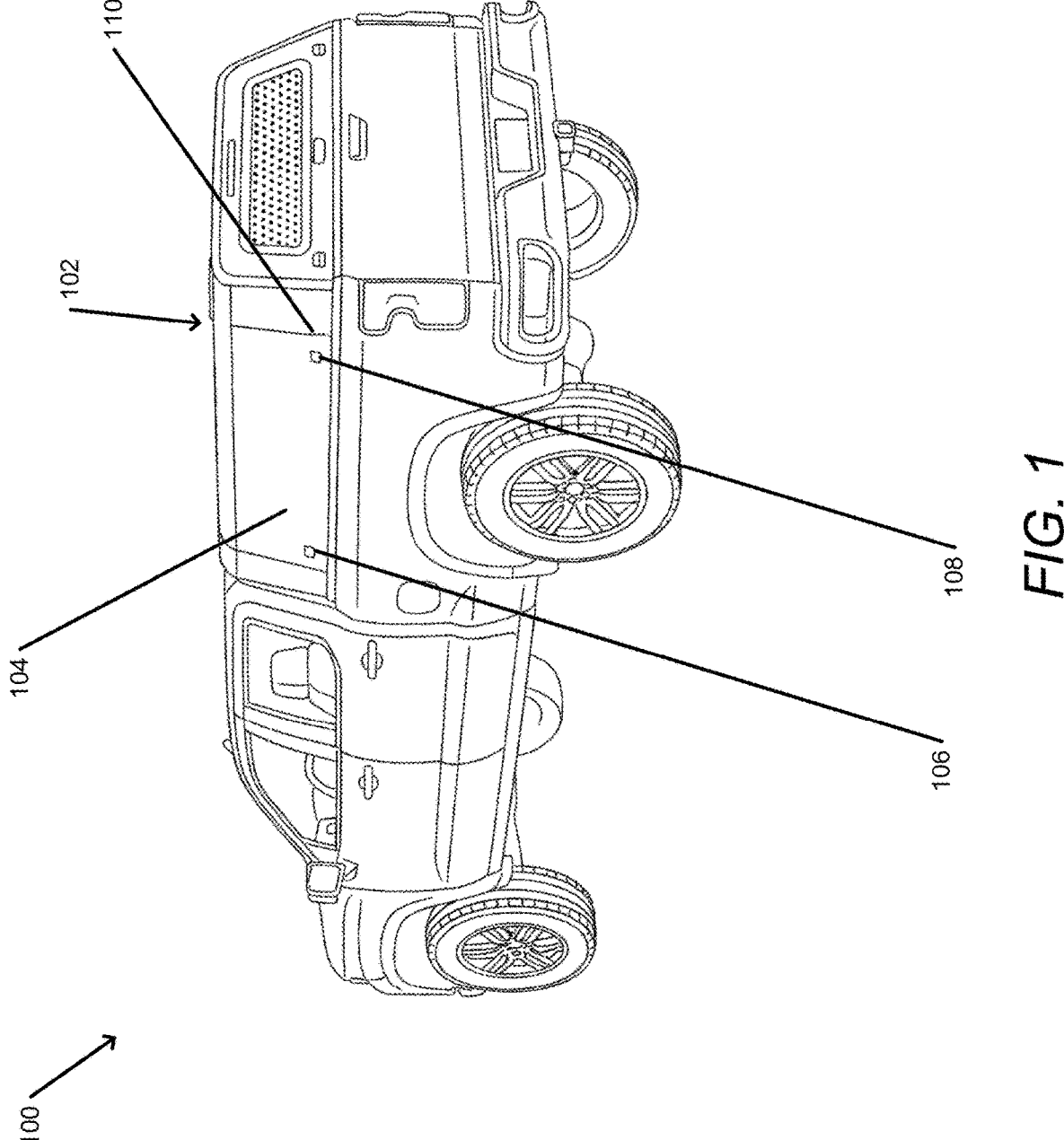
FIG. 1 illustrates a vehicle with an automotive canopy door, according to various examples of the present disclosure.

FIG. 1 illustrates a vehicle with an automotive canopy door, according to various examples of the present disclosure. The vehicle 100 includes a canopy 102. The canopy 102 includes an automotive canopy door 104 in the closed position. The automotive canopy door 104 includes an external panel 110, a first pressure lock 106, and a second pressure lock 108. In various embodiments, the number and orientation of the first pressure lock 106 and the second pressure lock 108 can be varied. In an example, the automotive canopy door 104 may include one pressure lock, such that the user would only be required to lock or unlock one pressure lock to open or close the automotive canopy door 104. In another example, the automotive canopy door 104 may include more than two pressure locks for added security. In an illustrative example, a user unlocks the first pressure lock 106 and the second pressure lock 108 to open the automotive canopy door 104 and access the vehicle bed to, for example, retrieve tools.

Figure 2:
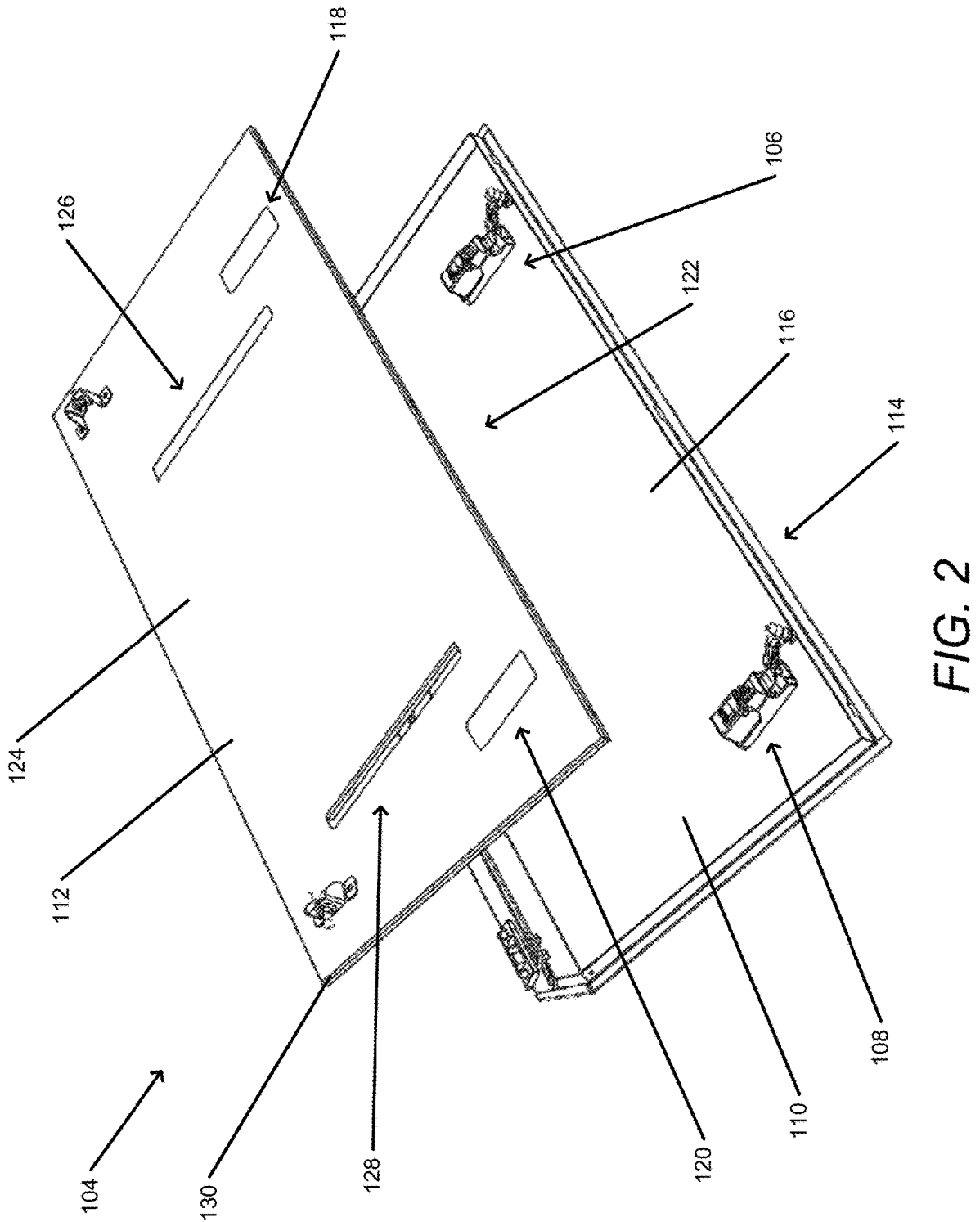
FIG. 2 illustrates an external panel and an internal panel of an automotive canopy door, according to various examples of the present disclosure.

FIG. 2 illustrates an external panel and an internal panel of an automotive canopy door, according to various examples of the present disclosure. The automotive canopy door 104 includes the external panel 110 and an internal panel 112. The external panel 110 includes a first side 114 and a second side 116. In reference to FIG. 1, the external panel 110 is visible from the outside of the vehicle 100, and the first side 114 of the external panel 110 faces outward, away from the vehicle bed 100 in the closed position. In various embodiments, the first pressure lock 106 and the second pressure lock 108 extend through the first side 114 of the external panel 110 to the second side 116 of the external panel 110. Further, the first pressure lock 106 and the second pressure lock 108 extend through a first pressure lock aperture 118 and second pressure lock aperture 120 in the internal panel 112. Thus, the first pressure lock 106 and the second pressure lock 108 are accessible from inside the vehicle bed.

The internal panel 112 includes a first side 122 and a second side 124. The first side 122 faces outward, toward the second side 116 of the external panel 110 while the second side 124 faces inward, toward the vehicle bed. The internal panel 112 further includes a first support aperture 126, a second support aperture 128, and a perimeter structure 130. The first support aperture 126 and the second support aperture 128 are further detailed in reference to FIG. 4.

Figure 3:
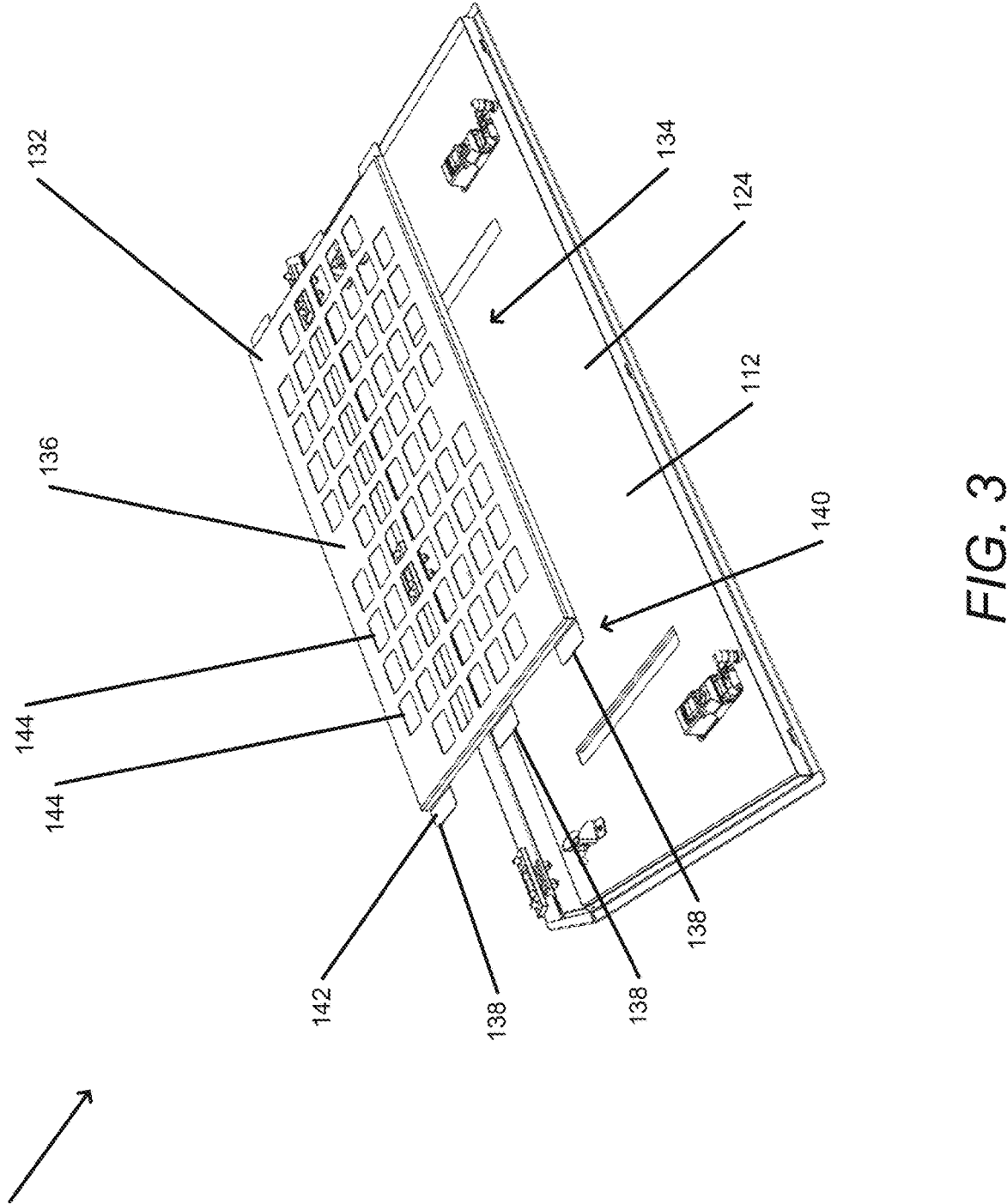
FIG. 3 illustrates an external panel, an internal panel, and a removable panel of automotive canopy door, according to various examples of the present disclosure.

FIG. 3 illustrates an external panel, an internal panel, and a removable panel of automotive canopy door, according to various examples of the present disclosure. The automotive canopy door 104 includes the internal panel 112, as previously introduced, which includes the second side 124. The automotive canopy door 104 further includes a removable panel 132 having a first side 134 and a second side 136. The first side 134 of the removable panel 132 faces the second side 124 of the internal panel 112 and the second side 136 of the removable panel 132 faces inward, toward the bed of the vehicle.

The removable panel 132 includes a plurality of apertures 144. The plurality of apertures 144 may provide accessible attachment points for various tools. The removable panel 132 further includes a plurality of tabs 138. Each one of the plurality of tabs 138 includes a first side 140 and a second side 142. The first side 140 of each of the plurality of tabs 138 faces the second side 124 of the internal panel 112, and the second side 142 of each of the plurality of tabs 138 faces inward, toward the bed of the vehicle. The removable panel 132 is coupled to the internal panel 112. In various embodiments, an interlocking system is disposed between the first side 140 of each of the plurality of tabs 138 and the second side 124 of the internal panel 112. The interlocking system allows a user to easily remove and re-attach the removable panel 132 to the internal panel 112 of the automotive canopy door 104. In various embodiments, the interlocking system includes 3M™ Dual Lock™ Reclosable Fasteners. In many embodiments, a hook and loop system, such as Velcro, is disposed between the first side 140 of each of the plurality of tabs 138 and the second side 124 of the internal panel 112.

Figure 4:
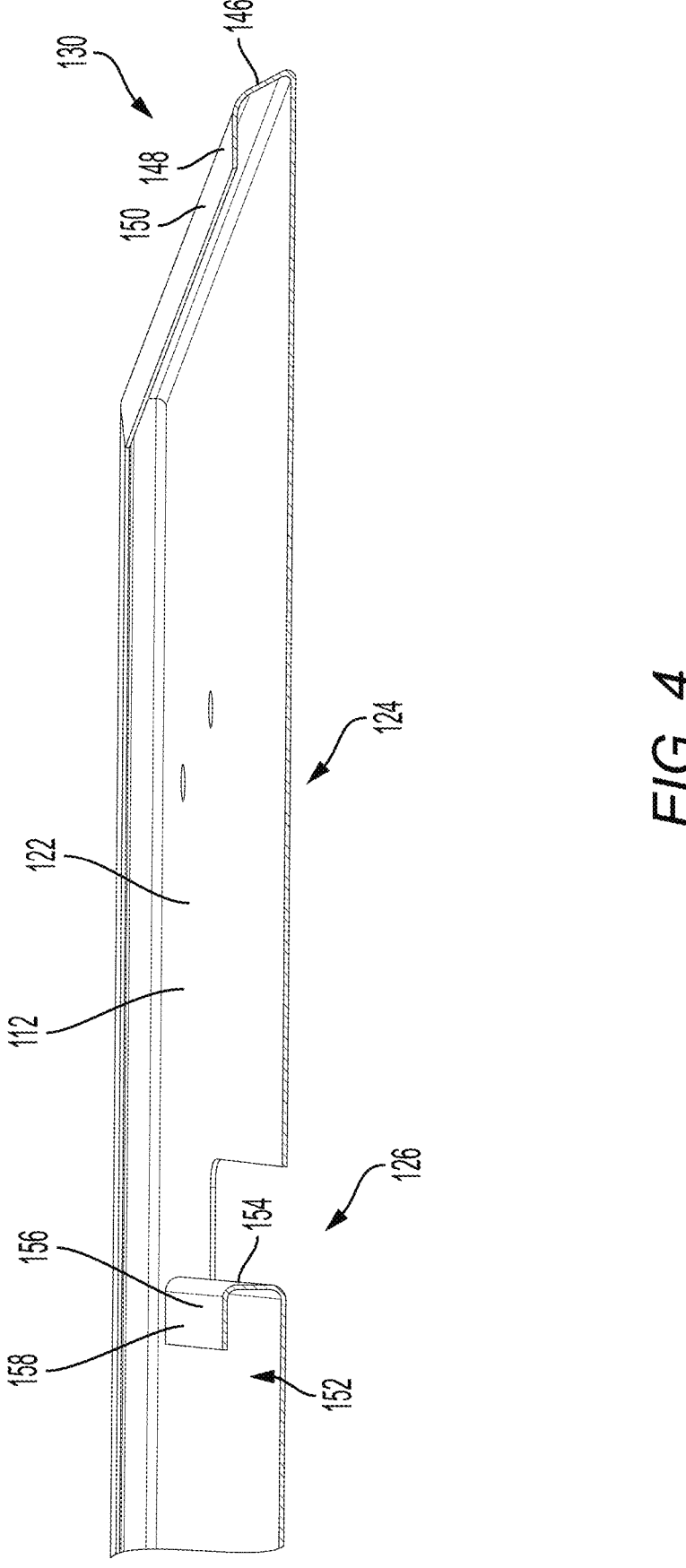
FIG. 4 illustrates a cross sectional view of an internal panel of automotive canopy door, according to various examples of the present disclosure.

FIG. 4 illustrates a cross sectional view of an internal panel of automotive canopy door, according to various examples of the present disclosure. The internal panel 112 includes the first side 122 and the second side 124. The internal panel 112 further includes a perimeter structure 130, a first support aperture 126, and a second support aperture 128 (not shown). The perimeter structure 130 includes a first portion 146 and a second portion 148 having a first side 150. In many embodiments, the first portion 146 extends outward from the first side 122 of the internal panel 112, and the second portion 148 extends generally coplanar to the first side 122 of the internal panel 112. As shown in FIG. 4, the first portion 146 extends from the first side 122 of the internal panel 112 at an acute angle. In various embodiments, this angle can be varied.

The internal panel 112 may further include a first support aperture 126. A first support structure 152 is located adjacent to the first support aperture 126. The first support structure 152 includes a first portion 154 and a second portion 156 having a first side 158. In many embodiments, the first portion 154 extends outward from the first side 122 of the internal panel 112, and the second portion 156 extends generally coplanar to the first side 122 of the internal panel 112. In many embodiments, the first portion 154 extends generally perpendicular to the first side 122 of the internal panel 112. In various embodiments, the first support structure 152 is comprised of material from the internal panel 112. In an example, the internal panel 112 is made from metal. During manufacture, a portion of the metal is cut from the internal panel 122 and folded, thereby creating the first support aperture 126 and the first support structure 152.

While the first support aperture 126 is used consistently in reference to the figures, the first support aperture 126 itself does not assist with support. Rather, the aperture is referred to as a first support aperture 126 based on its relationship with the first support structure 152. Further, the relationship between the first support aperture 126 and the first support structure 152 is advantageous because the material cut from the internal panel 122 forms the first support aperture 126 and the first support structure 152, leading to an increase in strength and rigidity without requiring additional parts to be added to the internal panel 122.

Figure 5:
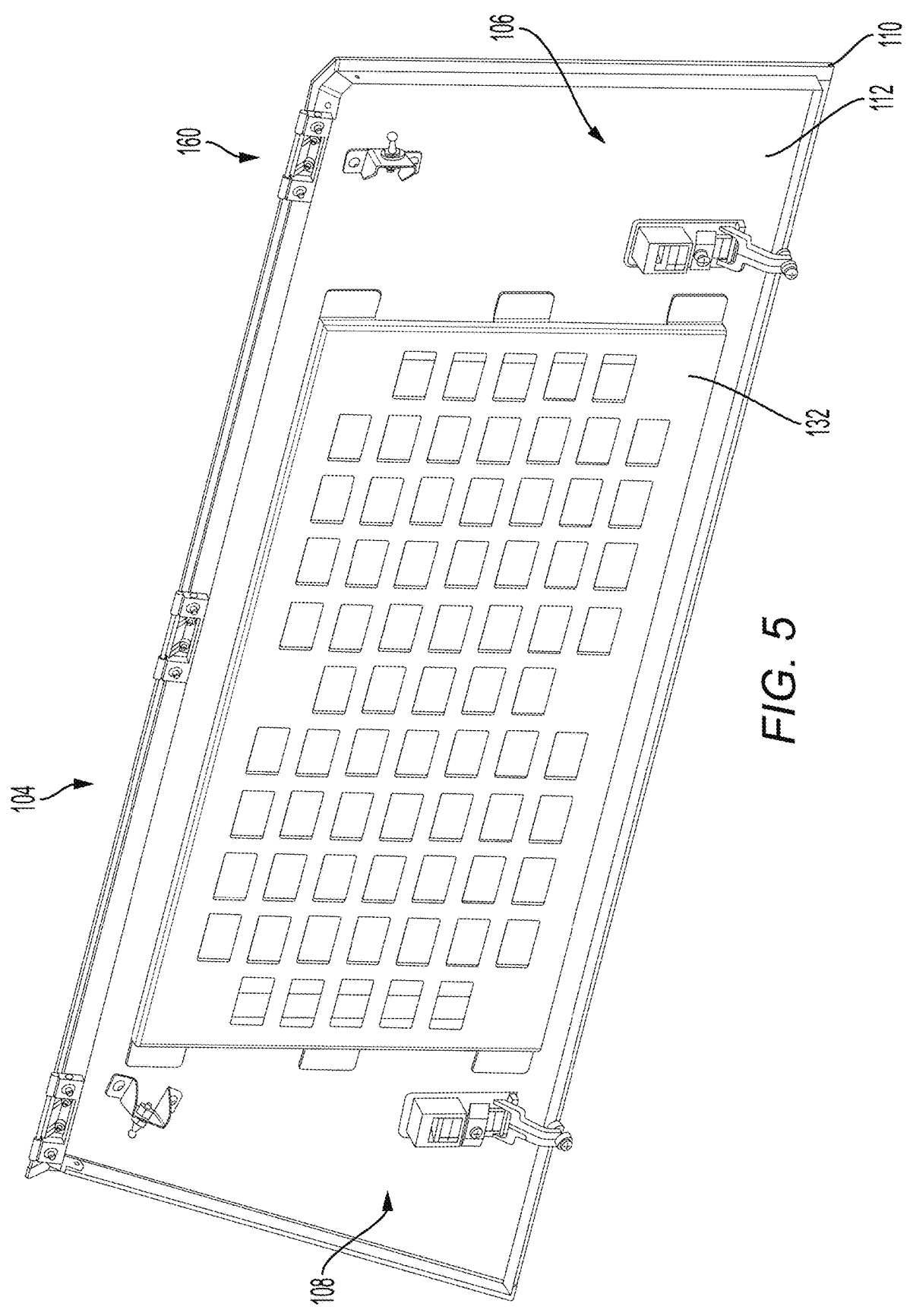
FIG. 5 illustrates an external panel, an internal panel, and a removable panel of an automotive canopy door in a coupled configuration, according to various examples of the present disclosure.

FIG. 5 illustrates an external panel, an internal panel, and a removable panel of an automotive canopy door in a coupled configuration, according to various examples of the present disclosure. In FIG. 5, the external panel 110 is coupled to the internal panel 112, which is coupled to the removable panel 132. In various embodiments, the external panel 110 includes at least one hinge 160, which attached the automotive canopy door 104 to the canopy. Further, as previously introduced, the first pressure lock 106 and the second pressure lock 108 extend through the external panel 110 and the internal panel 112, providing accessibility from the inside of a canopy. In an example, a user may unlock the first pressure lock 106 and the second pressure 108 from inside the canopy and open the automotive canopy door 104.

Figure 6A:
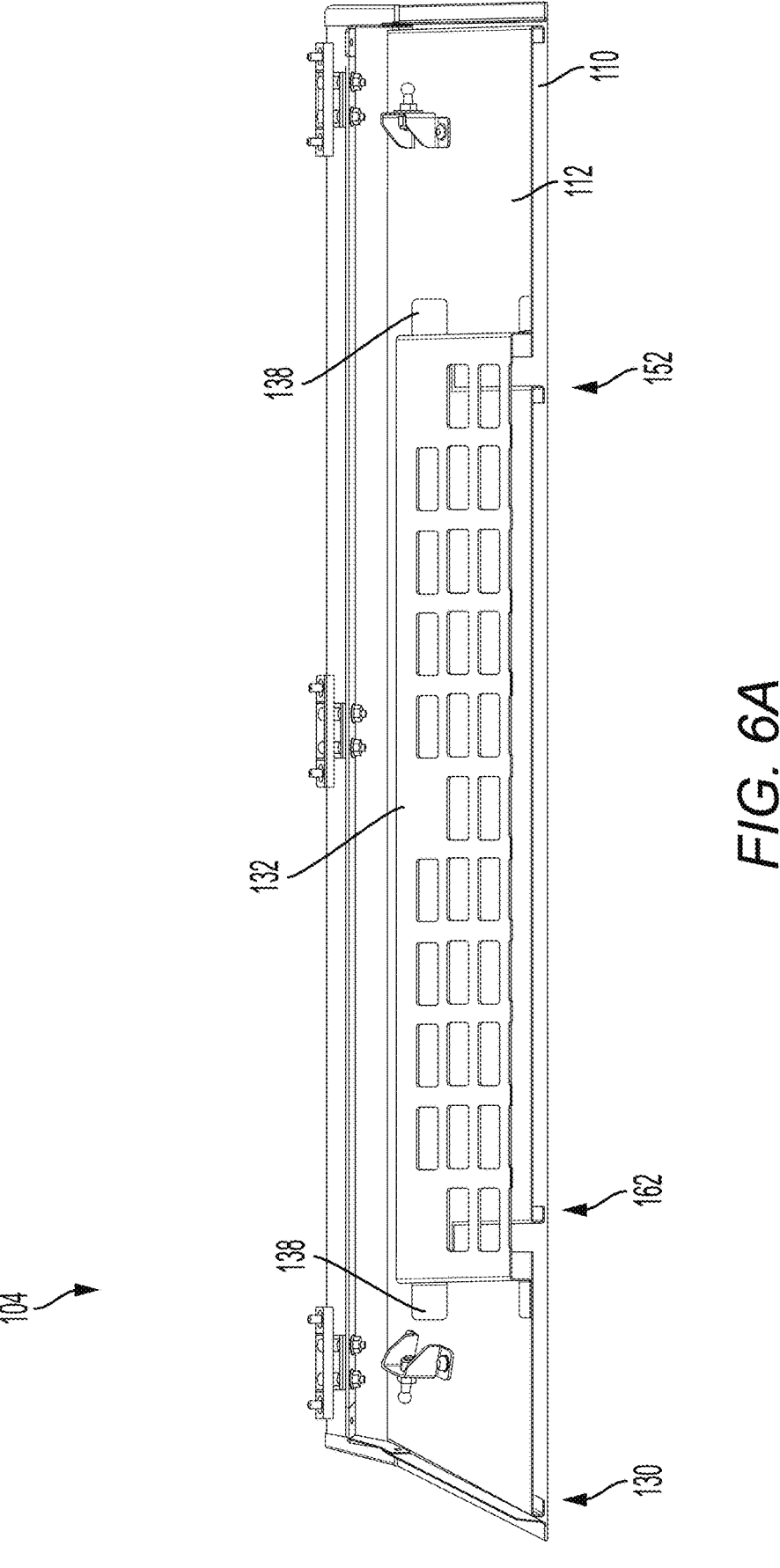
FIGS. 6A-B illustrate cross sectional views an external panel, an internal panel, and a removable panel of an automotive canopy door in a coupled configuration, according to various examples of the present disclosure.
Figure 6B:
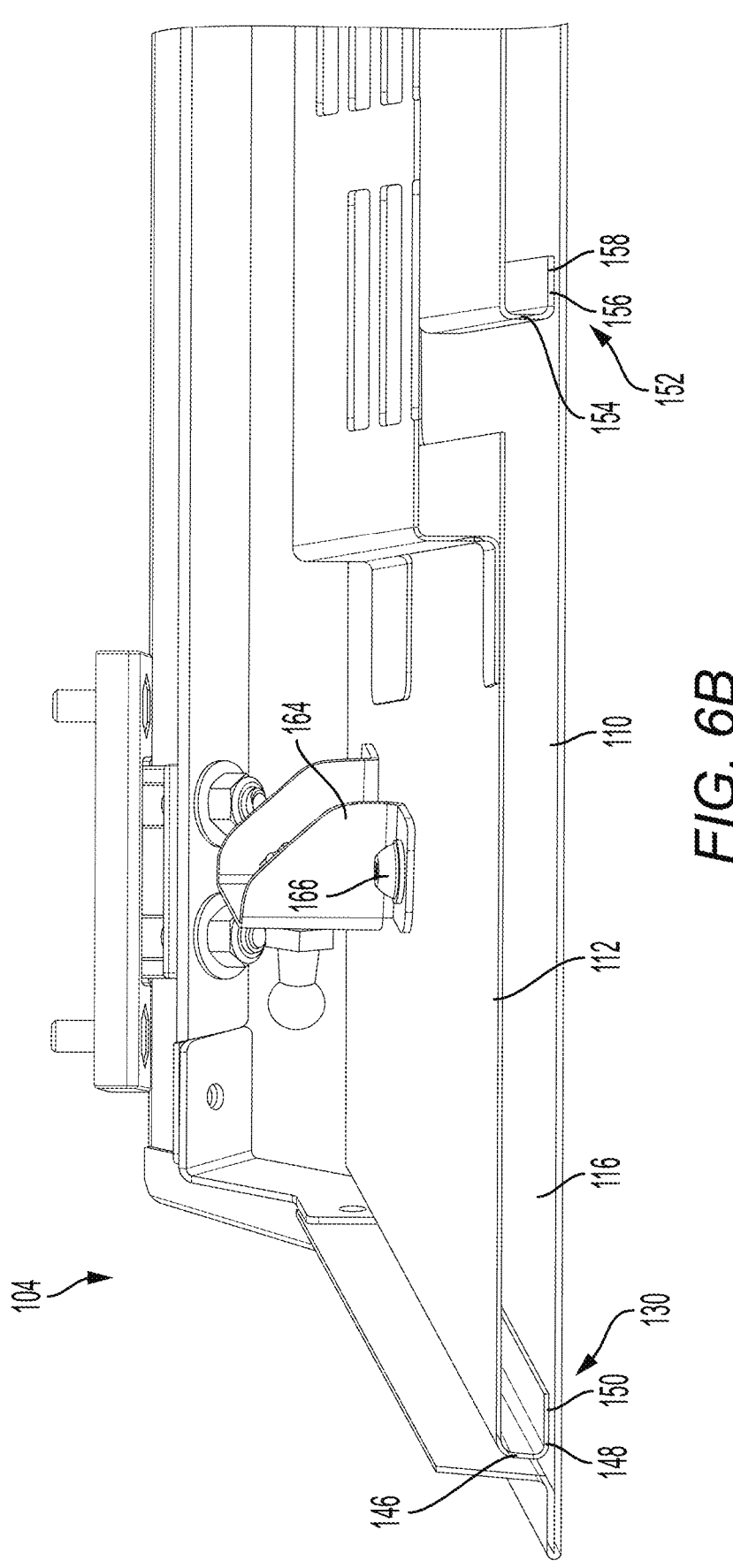

FIGS. 6A-B illustrate cross sectional views an external panel, an internal panel, and a removable panel of an automotive canopy door in a coupled configuration, according to various examples of the present disclosure. In FIG. 6A, the external panel 110 is coupled to the internal panel 112. In various embodiments, the first support structure 152, a second support structure 162, and the perimeter structure 130 of the internal panel 112 couple to the external panel 110. Further, the internal panel 112 is coupled to the removable panel 132 via a plurality of tabs 138.

FIG. 6B illustrates an exploded view of FIG. 6A. In a number of embodiments, the perimeter structure 130 includes the first portion 146 and the second portion 148 having a first side 150. The internal panel 112 is coupled to the external panel 110. In various embodiments, an adhesive substrate (not shown) is disposed between the first side 150 of the second portion 148 of the perimeter structure 130 and the second side 116 of the external panel 110. In many embodiments, an adhesive substrate (not shown) is also disposed between the first side 158 of the second portion 156 of the first support structure 152 and the second side 116 of the external panel 110. In an example, the adhesive substrate is Very High Bond™ Tape ("VHB Tape™").

In a number of embodiments, a component 164 is secured to the internal panel 112 via a securing member 166, which extends through the internal panel 112. In an example, the first portion 154 of the first support structure 152 and the first portion 146 of the perimeter structure 130 are configured such that the securing member 166 does not contact the second side 116 of the external panel 110.

Although the automotive canopy door 104 has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present disclosure can be practiced otherwise than specifically described without departing from the scope and spirit of the present embodiments. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention is claimed as follows:

1. An automotive canopy door, comprising:
an external panel having a first side and a second side; and
an internal panel having a first side and a second side,
wherein the first side of the internal panel is coupled to the second side of the external panel, the internal panel comprising:
a support structure comprising an internal bend formed into the internal panel, and
a support aperture,
wherein the support structure is located adjacent to the support aperture and the support aperture comprises a void in the internal panel formed from the support structure being internally bent from the internal panel.

2. The automotive canopy door of claim 1, wherein the internal panel comprises a perimeter structure.

3. The automotive canopy door of claim 2, wherein the perimeter structure comprises:
a first portion that extends outward from the first side of the internal panel; and
a second portion extends generally coplanar to the first side of the internal panel.

4. The automotive canopy door of claim 3, wherein an adhesive substrate couples the first side of the internal panel to the second side of the external panel.

5. The automotive canopy door of claim 4, wherein the adhesive substrate is disposed between the second portion of the perimeter structure and the second side of the external panel.

6. The automotive canopy door of claim 3, wherein the first portion is configured to provide a space between the external panel and the internal panel, preventing an internal panel securing member from contacting the second side of the external panel.

7. The automotive canopy door of claim 1, wherein the internal panel comprises a pressure lock aperture configured to receive a pressure lock coupled to the external panel.

8. The automotive canopy door of claim 1, wherein the support structure comprises:
a first portion that extends outward from the first side of the internal panel; and
a second portion extends generally coplanar to the first side of the internal panel.

9. The automotive canopy door of claim 1, further comprising a removable panel having first side and a second side,
wherein the first side of the removable panel is coupled to the second side of the internal panel, and
wherein the removable panel comprises a plurality of tabs, wherein each of the plurality of tabs comprises a first surface and a second surface.

10. The automotive canopy door of claim 9, wherein the removable panel comprises an aperture configured to receive an attachment.

11. The automotive canopy door canopy of claim 9, wherein an interlocking system is disposed between the first surface of each of the plurality of tabs and the second side of the internal panel.

12. An automotive canopy comprising:

a top panel;

a front panel;

a plurality of side panels;

a rear panel; and at least one door, comprising:

an external panel having a first side and a second side;

an internal panel having a first side and a second side, wherein the first side of the internal panel is coupled to the second side of the external panel, the internal panel comprising:

a support structure comprising an internal bend formed into the internal panel, and a support aperture, wherein the support structure is located adjacent to the support aperture and the support aperture comprises a void in the internal panel formed from the support structure being internally bent from the internal panel.

13. A modular kit for assembly of automotive canopy comprising:

a top panel;

a front panel;

a plurality of side panels;

a rear panel; and at least one door, comprising:

an external panel having a first side and a second side;

an internal panel having a first side and a second side, wherein the first side of the internal panel is coupled to the second side of the external panel, the internal panel comprising:

a support structure comprising an internal bend formed into the internal panel, and a support aperture, wherein the support structure is located adjacent to the support aperture and the support aperture comprises a void in the internal panel formed from the support structure being internally bent from the internal panel.

* * * * *